UNITED STATES PATENT OFFICE.

CARL SCHEIBLER, OF BERLIN, GERMANY.

PROCESS OF OBTAINING MAGNESIA.

SPECIFICATION forming part of Letters Patent No. 239,346, dated March 29, 1881.

Application filed January 20, 1881. (No specimens.)

*To all whom it may concern:*

Be it known that I, Professor Dr. CARL SCHEIBLER, a subject of the King of Prussia, residing at the city of Berlin, German Empire, have invented certain new and useful Improvements in the Process of Obtaining Magnesia; and I do hereby declare the following to be a full, clear, and exact description of the invention, such as will enable others skilled in the art to which it appertains to make and use the same.

My invention relates to a process for obtaining magnesia from dolomite or other magnesian limestone, or from crude magnesites; and it consists in slaking the burned limestone or dolomite or magnesite and then treating the slaked material in a saccharine solution to dissolve out the lime, or to treat the caustic lime or dolomite or magnesite without slaking in a saccharine solution.

The invention is based upon the solubility of caustic lime in a saccharine solution, in which the magnesia is insoluble.

The limestone or dolomite containing magnesia, or the magnesite combined with lime, is first burned, and the caustic product, free from carbonic acid, is then dissolved in a saccharine solution (made from sugar or molasses) containing from ten to fifteen per cent. of sugar, (from one hundred to one hundred and fifty grams to the liter,) either by pouring the solution over the caustic product as it comes from the kiln and dissolving out the lime and allowing the insoluble magnesia to settle, or by first comminuting the caustic product, which is best effected by slaking with just sufficient water to obtain a pulverulent hydrate. This pulverulent hydrate is then thrown into the saccharine solution, when the reaction of the latter upon the former will take place very rapidly, the lime will be dissolved, and the magnesia and other non-soluble components, such as silicious earth, clay, oxide of iron, &c., will settle; but, owing to the greater gravity of the latter, these will settle first and the magnesia afterward, forming an upper layer, from which the lower may be removed in any convenient manner after decantation; or the magnesia may be removed from the solution by filtration or by means of filter-presses or other like means.

The percentage of sugar in the solution may be varied according to the material treated.

The magnesia thus obtained may be employed for various purposes in the arts, either in a pure state or mixed with the insoluble constituents with which it was originally combined, or by the addition thereto of binding materials. In its pure state it may be employed in the clarification and purification of sirups and other analogous purposes in a mixed state; or by addition thereto of suitable binding materials containing carbureted hydrogen, or by the addition thereto of any of the well-known fluxes, it may be employed for refractory bricks, furnace-linings, or other fire-proof articles. When employed for the latter purpose, the magnesia as obtained by this process has the advantage over the lime combinations usually employed in not being affected by contact with water or moisture, and in the fact that articles produced therefrom, either when air or kiln dried, will not crumble or become disintegrated.

The saccharine solution may be regenerated after each operation by treating it with carbonic acid to remove the lime therefrom or by treating the solution in any other well-known manner. In practice I employ carbonic acid, which I obtain from the kilns, or I employ the waste gases from a blast-furnace, by means of which the expenses may be materially reduced.

Having now described my invention, what I claim is—

1. The process of obtaining magnesia from limestone, dolomite, magnesite, or other lime and magnesia combinations, by first burning the material and then treating it with a saccharine solution to dissolve out the lime, and removing the magnesia from the other insoluble constituents after precipitation by decantation, filtration, or otherwise.

2. The process of obtaining magnesia from limestone, dolomite, magnesite, or other lime and magnesia combinations, by first burning the material and reducing the caustic product to a pulverulent hydrate by slaking, then treating the pulverulent hydrate with a saccharine solution, and separating the magnesia from the insoluble constituents after precipitation by decantation, filtration, or otherwise, as and for the purpose specified.

In testimony whereof I affix my signature in presence of two witnesses.

CARL SCHEIBLER.

Witnesses:
GEORGE LOUBIER,
BERTHOLD ROI.